(12) United States Patent
Tophoven

(10) Patent No.: US 11,391,228 B2
(45) Date of Patent: Jul. 19, 2022

(54) METHOD AND DEVICE FOR OPERATING AN INTERNAL COMBUSTION ENGINE INCLUDING AN ELECTRICALLY SUPPORTED EXHAUST GAS-DRIVEN SUPERCHARGING DEVICE

(71) Applicant: ROBERT BOSCH GMBH, Stuttgart (DE)

(72) Inventor: Jens Tophoven, Werbach (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 16/927,149

(22) Filed: Jul. 13, 2020

(65) Prior Publication Data

US 2021/0010433 A1 Jan. 14, 2021

(30) Foreign Application Priority Data

Jul. 11, 2019 (DE) .......................... 102019210256.5

(51) Int. Cl.
*F02D 41/02* (2006.01)
*F02B 37/04* (2006.01)
*F02D 41/24* (2006.01)

(52) U.S. Cl.
CPC ............ *F02D 41/024* (2013.01); *F02B 37/04* (2013.01); *F02D 41/2406* (2013.01); *F02D 2200/101* (2013.01); *F02D 2200/70* (2013.01)

(58) Field of Classification Search
CPC ............... F02D 41/024; F02D 41/2406; F02D 2200/101; F02D 2200/70; F02D 2200/021; F02D 2200/10; F02D 41/0007; F02B 37/04; Y02T 10/12
See application file for complete search history.

(56) References Cited

U.S. PATENT DOCUMENTS

| | | | |
|---|---|---|---|
| 2007/0125346 A1* | 6/2007 | Vetrovec | F02B 33/44 60/599 |
| 2009/0259388 A1* | 10/2009 | Vetrovec | F02D 23/00 701/103 |
| 2014/0224228 A1* | 8/2014 | Benjey | F02D 41/0007 123/559.3 |
| 2017/0002726 A1* | 1/2017 | Iwamoto | F02B 37/04 |
| 2019/0264591 A1* | 8/2019 | Mimura | F02D 41/12 |
| 2021/0102545 A1* | 4/2021 | Weigand | F02C 6/12 |

FOREIGN PATENT DOCUMENTS

DE 102016222928 A1 5/2018

* cited by examiner

*Primary Examiner* — Sizo B Vilakazi
(74) *Attorney, Agent, or Firm* — Norton Rose Fulbright US LLP; Gerard Messina

(57) ABSTRACT

A method for operating an internal combustion engine including an exhaust gas-driven supercharging device having an electric support drive. The method includes providing an operating point specification of the internal combustion engine, ascertaining a maximum admissible recuperation output in a recuperation mode of the electric support drive as a function of the operating point specification, and limiting the recuperation output to the maximum admissible recuperation output in the recuperation mode.

8 Claims, 2 Drawing Sheets

METHOD AND DEVICE FOR OPERATING AN INTERNAL COMBUSTION ENGINE INCLUDING AN ELECTRICALLY SUPPORTED EXHAUST GAS-DRIVEN SUPERCHARGING DEVICE

CROSS REFERENCE

The present application claims the benefit under 35 U.S.C. § 119 of German Patent Application No. 102019210256.5 filed on Jul. 11, 2019, which is expressly incorporated herein by reference in its entirety.

FIELD

The present invention relates to supercharged internal combustion engines including an electrically supported, exhaust gas-driven supercharging device and in particular methods for recuperating electrical energy through generator-based operation of an electric support drive for the supercharging device.

BACKGROUND INFORMATION

Supercharged internal combustion engines in general include an exhaust gas-driven supercharging device, a so-called exhaust gas turbocharger, that aspirates and compresses ambient air by making use of the exhaust gas enthalpy of the combustion exhaust gas and provides same to the internal combustion engine to be supplied to the combustion chambers of the cylinders under a supercharging pressure that is higher with regard to the ambient pressure.

The providable supercharging pressure or the compressor capacity is mainly determined by the air mass flow through the compressor and the provided exhaust gas enthalpy of the combustion exhaust gas. The provided exhaust gas enthalpy determines the compression capacity provided for compressing the aspirated fresh air and is predefined by the operating point of the internal combustion engine. In addition, the compressor is subject to a limitation that is predefined by the criteria of the component protection and by the so-called compressor surge, which represents a type of operation of the compressor in which vibrations and a stall occur at the compressor wheel blades.

To increase the dynamic of such an exhaust gas-driven supercharging device, exhaust gas-driven supercharging devices may be provided with an electric support drive, a so-called ETA (electric turbo assist), in order to achieve a compression by supplying electrical power that would not have been achievable by the sole use of exhaust gas enthalpy. The electric support drive engages at the shaft between the compressor and the turbine of the supercharging device to additionally accelerate the compressor of the supercharging device by providing additional electrically generated drive torque. This is described German Patent Application No. DE 10 2016 222 928 A1, for example.

Conventionally, electrical energy may also be recuperated by converting mechanical energy obtained from the exhaust gas enthalpy with the aid of the electric support drive. The recuperable electrical power is a function of the operating point of the internal combustion engine. In general, the recuperable electrical energy is higher the higher the load range and the rotational speed of the internal combustion engine is, since the exhaust gas enthalpy increases accordingly. In the transition range toward component protection at a high engine load and at high rotational speeds, a high recuperated electrical power may, however, result in excessively high exhaust gas temperatures, at which an operation of the exhaust gas-driven supercharging device is not admissible for component protection reasons or an increased enrichment of the mixture is necessary.

SUMMARY

According to an example embodiment of the present invention, a method for operating an internal combustion engine is provided including an exhaust gas-driven supercharging device having electric support drive, as well as with the aid of a device and an engine system.

Additional embodiments are described herein.

According to a first aspect of the present invention, a method for operating an internal combustion engine including an exhaust gas-driven supercharging device having an electric support drive is provided. In accordance with an example embodiment of the present invention, the method includes the following steps:

providing an operating point specification of the internal combustion engine;
ascertaining a maximum admissible recuperation output in a recuperation mode of the electric support drive as a function of the operating point specification; and
limiting the recuperation output to the maximum admissible recuperation output in the recuperation mode.

The operation of the exhaust gas-driven supercharging device is in general coupled directly to the operating point of the internal combustion engine. The more exhaust gas enthalpy is available, the higher is the retrievable mechanical power and the higher is the available compression capacity and recuperable electrical power. However, the operation of the supercharging device is subject to limitations for the protection of components, in particular the turbine blades of the exhaust gas turbine, so that the temperature and the rotational speed of the exhaust gas turbine are delimited. Measures for delimiting the temperature of the exhaust gas turbine usually relate to a limitation of the exhaust gas temperature, which is usually achieved by enriching (operation at excess fuel via stoichiometric air/fuel ratio) the air/fuel mixture in the internal combustion engine with additionally injected fuel.

In connection with a high recuperation output, i.e., a conversion of a large portion of the exhaust gas enthalpy into electrical energy, which is generated regeneratively with the aid of the support drive of the supercharging device, an undesirable enlargement of the enrichment range may occur. The above-named method therefore provides to maximize the recuperation output, but to delimit same at the same time as a function of the operating point of the internal combustion engine to a maximum admissible recuperation output, if there is a risk that the exhaust gas temperature further increases in the case of higher recuperation output and thus the maximum admissible exhaust gas temperature might be reached or exceeded.

In general, it applies to exhaust gas-driven supercharging devices having electric support drives that in the recuperation mode, there is an almost linear correlation between fuel consumption and available recuperation output, if the recuperated energy is supplied to the drive of the motor vehicle. Alternatively, the recuperated electrical energy may also be supplied to the vehicle electrical system, which in turn results in the internal combustion engine being relieved and thus in less fuel consumption. In relation to the fuel consumption, it is thus always advantageous to recuperate the maximally possible electrical power and to supply the recuperation output to the driving energy or the vehicle electrical system, as long as the internal combustion engine is in a moderate performance range.

In particular, in the case of high load ranges in which the load torque and the engine speed are high, there would theoretically be a lot of potential for recuperating electrical power with the aid of the electric support drive as a result of the high exhaust gas enthalpy of the combustion exhaust gas. In these operating ranges, the combustion exhaust gas has a high exhaust gas temperature, however, that in general exceeds the limiting values admissible for the components in the exhaust gas system, such as the exhaust gas turbine of the supercharging device, for example. To reduce the exhaust gas temperature, protective functions provide for measures, in the case of which the exhaust gas temperature is delimited by enriching the air/fuel mixture. However, the enrichment need results in a higher consumption and more emissions.

Furthermore, higher exhaust gas back pressures result when the waste gate or the supercharger actuator is closed, thus resulting in higher charge cycle losses and more residual gas in the cylinder. This results in a higher knocking tendency that results in later combustion positions, by which the exhaust gas temperature also increases. In the transition range toward enrichment at a high engine output and in the case of an exhaust gas temperature that has not yet reached the temperature threshold value of the exhaust gas turbine, it is still possible to recuperate an electrical power with the aid of the electric support drive. It is provided for this reason to establish the maximal recuperation output of the electric support drive as a function of the operating point to a value that is below the maximally recuperable power, but still converts a portion of the available exhaust gas enthalpy that does not result in a further increase in the exhaust gas temperature.

This may take place, for example, with the aid of a pilot control that is related to a characteristic map. Alternatively or additionally, a control of the exhaust gas temperature may be provided based on a measurement of the exhaust gas temperature using an exhaust gas temperature sensor, for example.

The operating point specification may be further predefined by a rotational speed and/or a load torque of the internal combustion engine.

According to one specific example embodiment of the present invention, the maximum admissible recuperation output may be determined by a predefined limiting function as a function of the operating point specification, the limiting function being predefined in such a way that in the case of a recuperation mode having the maximum admissible recuperation output, no further increase in the exhaust gas temperature of the combustion exhaust gas or no increase in the exhaust gas temperature of the combustion exhaust gas above the temperature limit predefined for an exhaust gas turbine or another component of the exhaust gas system takes place due to the recuperation mode.

It may be provided that the maximum admissible recuperation output is acted on by a correcting variable that results based on a further characteristic map from at least one of the following variables: the ignition timing, the ambient temperature, and the oil or cooling water temperature.

According to one specific example embodiment of the present invention, the maximum admissible recuperation output may be corrected based on a control of the exhaust gas temperature, a recuperation output correction being ascertained as a manipulated variable, the control being based on a rule deviation resulting from a predefined maximum admissible exhaust gas temperature, which corresponds to a temperature limitation for the components of the exhaust gas system of the internal combustion engine, and an actual exhaust gas temperature.

Furthermore, the recuperation mode of the supercharging device may be engaged, if a larger quantity of the exhaust gas enthalpy is available than is necessary for the compression in a compressor of the supercharging device.

According to a further aspect of the present invention, a device for operating an internal combustion engine including an exhaust gas-driven supercharging device having an electric support drive is provided. In accordance with an example embodiment of the present invention, the device is designed to:

provide an operating point specification that indicates an operating point of the internal combustion engine;
ascertain a maximum admissible recuperation output in a recuperation mode of the electric support drive as a function of the operating point specification;
limit the recuperation output to the maximum admissible recuperation output in the recuperation mode.

BRIEF DESCRIPTION OF THE DRAWINGS

Specific example embodiments are elucidated in greater detail below on the basis of the figures.

DETAILED DESCRIPTION OF EXAMPLE EMBODIMENTS

Figure 1:
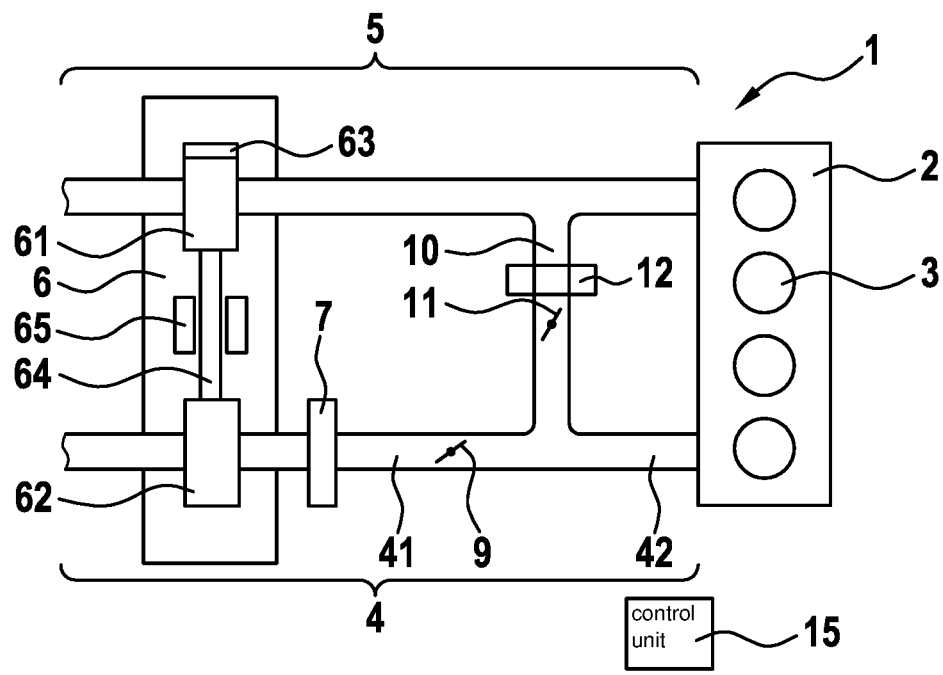
FIG. 1 shows a schematic illustration of an engine system including an exhaust gas-driven supercharging device having an electric support drive.

FIG. 1 shows an engine system 1 including an internal combustion engine 2, which has a number of cylinders 3. In the present exemplary embodiment, four cylinders 3 are provided by way of example.

Internal combustion engine 2 is supplied ambient air via an air supply system 4 in a conventional manner. Combustion exhaust gas is discharged from cylinders 3 via an exhaust gas system 5. Air supply system 4 is connected to cylinders 3 of internal combustion engine 2 via inlet valves (not shown) in a conventional manner. Combustion exhaust gas is discharged via corresponding outlet valves (not shown) into exhaust gas system 5 in a conventional manner.

A supercharging device 6 may be provided that includes an exhaust gas turbine 61 in exhaust gas system 5 and a supercharger compressor 62 in air supply system 4. Exhaust gas turbine 61 is mechanically coupled to supercharger compressor 62, for example via a shaft 64, so that the exhaust gas enthalpy, which is converted into mechanical energy in exhaust gas turbine 61, is used to compress the ambient air retrieved from the surroundings in supercharger compressor 62. The quantity or the portion of the exhaust gas enthalpy converted into mechanical energy may be variably adjusted by a supercharger actuator 63 situated at or in exhaust gas turbine 61.

Supercharger actuator 63 may be designed as a VTG (variable turbine geometry) actuator, as a waste gate actuator, or the like, in a conventional manner.

A support of the compression may be provided by supercharger compressor 62 with the aid of a support drive 65 (as an electric drive) in supercharging device 6. Support drive 65 may additionally introduce mechanical energy by mechanically coupling supercharger shaft 64 of exhaust gas turbine 61 and supercharger compressor 62, so that supercharger compressor 62 may also be operated independently of the mechanical energy provided by exhaust gas turbine 61.

A charge air cooler 7 may be provided downstream from compressor 62. A charge air section 41 of air supply system 4, in which the charge air is made available under a supercharging pressure, is provided downstream from charge air cooler 7.

Charge air section 41 may be delimited downstream by a throttle valve 9. An intake manifold section 42 of air supply system 4 is located between throttle valve 9 and the inlet valves of cylinders 3 of internal combustion engine 2. In one alternative specific embodiment, charge air cooler 7 may also be situated downstream from throttle valve 9.

Between a section of exhaust gas system 5, which is located between the outlet valves of cylinders 3 of internal combustion engine 2 and exhaust gas turbine 61, an exhaust gas recirculation line 10 may lead into intake manifold section 42. An exhaust gas recirculation valve 11 may be situated in exhaust gas recirculation line 10 to allow for the level of the recirculated exhaust gas mass flow to be adjusted.

An exhaust gas cooler 12 may be furthermore situated in exhaust gas recirculation line 10 in order to reduce the temperature of the recirculated exhaust gas. Instead of the exhaust gas recirculation being implemented by exhaust gas recirculation line 10, it is also possible to implement same through a variable valve train assembly for the inlet and outlet valves. An exhaust gas recirculation results in that the inlet valve is opened while the outlet valve is still open, so that the fresh air that is compressed due to the higher pressure in intake manifold section 42 with regard to the pressure in exhaust gas system 5 upstream from exhaust gas turbine 61 flows through cylinders 3 into the exhaust system (scavenging).

During normal operation of internal combustion engine 2, the exhaust gas pressure in exhaust gas system 5 is oftentimes greater than the intake manifold pressure in intake manifold section 42 of air supply system 4. This pressure gradient is normally used for the controlled exhaust gas recirculation from the outlet side of internal combustion engine 2 to its inlet side.

A control unit 15 is provided that operates internal combustion engine 2 in a conventional manner by actuating the actuator, such as for example throttle valve 9, supercharger actuator 63, exhaust gas recirculation valve 11, the fuel injectors for specifying the quantity of the injected fuel (not shown), and the like according to an instantaneous operating state of internal combustion engine 2 and according to a specification, for example a driver input torque.

Figure 2:
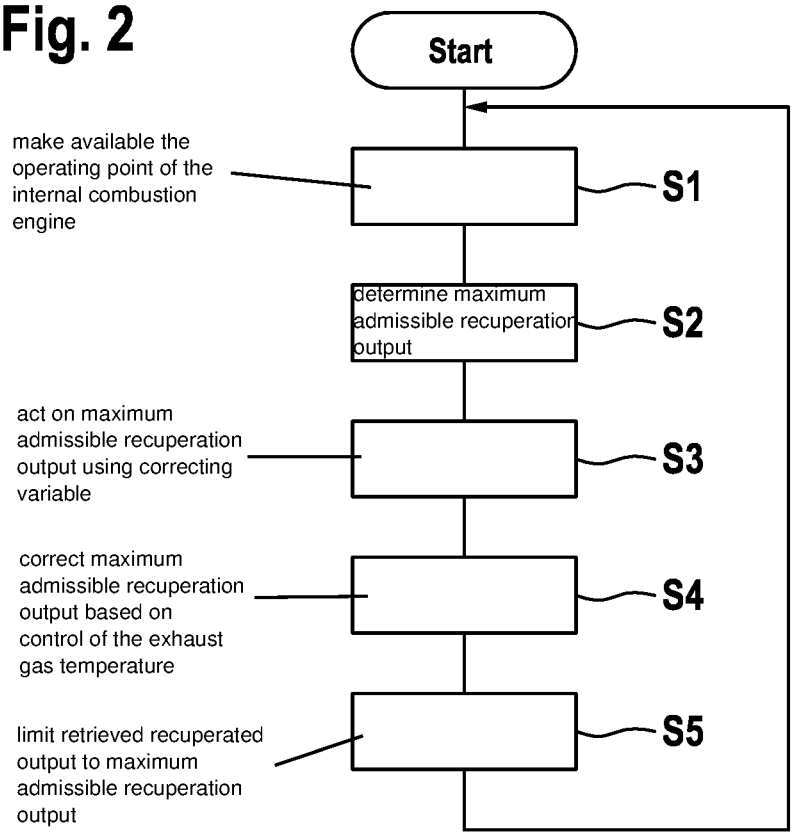
FIG. 2 shows a flow chart for illustrating a method for operating the internal combustion engine in accordance with an example embodiment of the present invention.

An example method in accordance with the present invention for operating the engine system is described in the following in greater detail based on the flow chart of FIG. 2. For the supercharging of internal combustion engine 2 and, potentially, for the recuperation of electrical energy, it is reasonable in general from efficiency points of view to convert the maximum available exhaust gas enthalpy via the electric support drive. However, in the high load range, the conversion of the exhaust gas enthalpy completely into recuperation energy is not admissible, due to the component protection, as a result of which the exhaust gas temperature in particular must be limited to a maximum exhaust gas temperature. The higher exhaust gas back pressure effectuated by the recuperation results in further increasing exhaust gas temperatures due to the interventions into the operation of internal combustion engine 2, so that a recuperation is no longer admissible or the admissible recuperation output is limited to 0 in the recuperation mode in the case of predetermined operating ranges of high load.

The following example method influences the operation of internal combustion engine 2 in a transition range between the operating points using a complete conversion of the available exhaust gas enthalpy into supercharging of fresh air and the recuperation of electrical energy and the operating points of high load, in which no recuperation of electrical energy is admissible, by specifying a maximum recuperation output.

For this purpose, in step S1, the operating point of internal combustion engine 2 is made available which may be determined by the load torque and the rotational speed of the internal combustion engine.

In step S2, a maximum admissible recuperation output is determined based on the operating point of internal combustion engine 2. This may take place with the aid of a suitable predefined limitation model, in particular based on a look-up table or the like.

The limitation model may be selected in such a way that between the operating range, in which a complete use of the exhaust gas enthalpy is available for the recuperation of electrical power, and the operating range, in which the recuperation of electrical power is not admissible or is completely suppressed due to component protection, only some of the maximum available recuperable output is retrieved. This takes place through limitation to the resulting maximum admissible recuperation output.

In this way, a further increase in the exhaust gas temperature in the direction of the maximum admissible exhaust gas temperature is prevented or same is limited to the maximum admissible exhaust gas temperature. In particular, the maximum recuperation outputs are established in such a way that in the case of the operating point in question and in the case of a steady-state engine system, no further increase in the exhaust gas temperature occurs above the temperature tolerated by exhaust gas turbine 61.

In step S3, the maximum admissible recuperation output may optionally be acted on by a correcting variable that results based on a further characteristic map from at least one of the following variables: the ignition timing, the ambient temperature, and the oil and cooling water temperature.

In step S4, a correction of the maximum recuperation output may furthermore also be carried out based on a control of the exhaust gas temperature. The above-named limitation of the recuperation output is then used for pilot control.

The controlling intervention of a control of the exhaust gas temperature corresponds to a recuperation output correction as the manipulated variable, using which the recuperation output ascertained in steps S2 or S3 is acted on. The control is based on a rule deviation that results from a predefined maximum admissible exhaust gas temperature corresponding to a temperature limitation for the components of exhaust gas system 5 and an actual exhaust gas temperature that may be measured or modelled. The control may be designed as a P, a PI, a PID, or a PD control. In this way, the maximum exhaust gas temperature may be further adjusted.

In step S5, the retrieved recuperated output is therefore limited in the electric support drive to the maximum admissible recuperation output.

Figure 3:
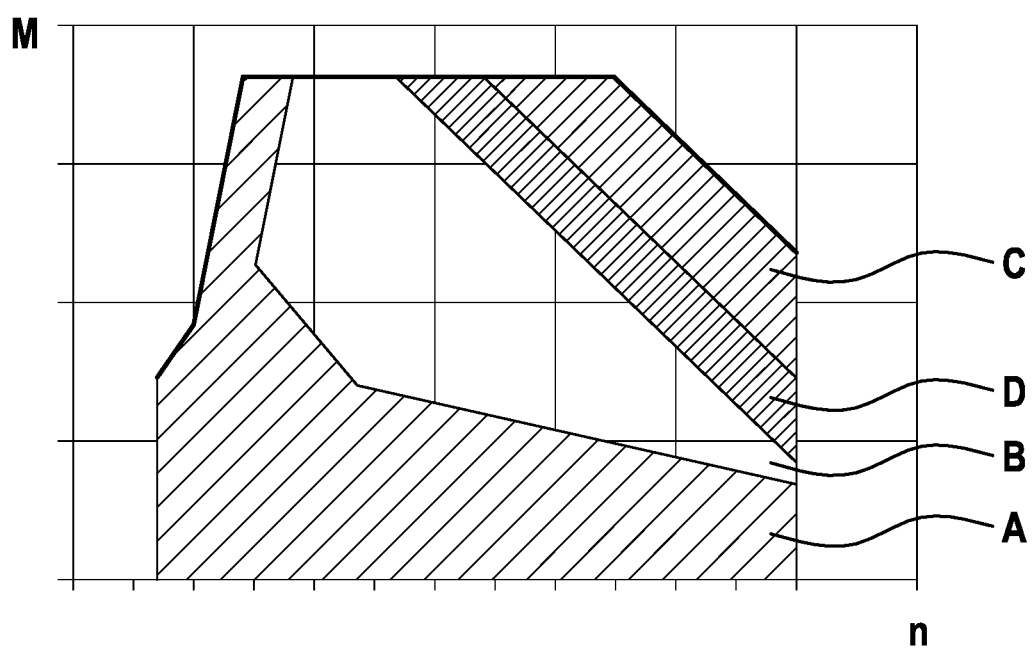
FIG. 3 shows a characteristic map of the operating states of the internal combustion engine, in which a limitation of the recuperation output is provided according to the example method according to the present invention.

FIG. 3 schematically shows a characteristic map of the operating points of internal combustion engine 2. The characteristic map shows as a function of the operating point of internal combustion engine 2 the operating ranges, in which no recuperation (operating range A), a maximum recuperation (operating range B), a suppressed recuperation (operating range C), and a delimited recuperation (operating range D) is present from the conversion of the exhaust gas enthalpy.

In operating range A, no recuperation is carried out, since the recuperation potential is only insufficiently possible due to low exhaust gas enthalpy and due to low exhaust gas mass flow. An operation of engine system 1 in operating range B, which is characterized by the operating points of higher load, makes the maximum recuperation of the available exhaust gas enthalpy possible, while in the case of an operation in operating range C, the recuperation is suppressed, since internal combustion engine 2 is operated in enrichment mode, i.e., the combustion takes place under excess fuel to limit the exhaust gas temperature for component protection to the predefined maximum admissible exhaust gas temperature.

In an operating range D in the case of load points between operating range B and operating range C, a transition is provided according to the above-named method, in which the excess exhaust gas enthalpy is not completely converted into recuperable output, but only some of it. On the one hand, this makes it possible that the exhaust gas temperature does not exceed the admissible temperature limiting value for the components in the exhaust gas system, in particular exhaust gas turbine 61, (in this case enrichment would be necessary), and, on the other hand, that the available exhaust gas enthalpy is used to recuperate electrical power.

What is claimed is:

1. A method for operating an internal combustion engine including an exhaust gas-driven supercharging device having an electric support drive, the method comprising the following steps:
   providing an operating point specification that indicates an operating point of the internal combustion engine;
   ascertaining a maximum admissible recuperation output in a recuperation mode of the electric support drive as a function of the operating point specification; and
   limiting a recuperation output to the maximum admissible recuperation output in the recuperation mode.

2. The method as recited in claim 1, wherein the operating point specification is further predefined by a rotational speed of the internal combustion engine and/or a load torque of the internal combustion engine.

3. The method as recited in claim 1, wherein the maximum admissible recuperation output is determined by a predefined limiting function as a function of the operating point specification, the limiting function being predefined in such a way that in the case of a recuperation mode having the maximum admissible recuperation output, no further increase in the exhaust gas temperature of the combustion exhaust gas or no increase in the exhaust gas temperature of the combustion exhaust gas above the temperature limit predefined for a component of the exhaust gas system takes place due to the recuperation mode.

4. The method as recited in claim 1, wherein the maximum admissible recuperation output is acted on by a correcting variable that results based on a further characteristic map from at least one of the following variables: (i) the ignition timing, and/or (ii) an ambient temperature, and/or (iii) an oil temperature or cooling water temperature.

5. The method as recited in claim 1, wherein the maximum admissible recuperation output is corrected based on a control of an exhaust gas temperature, a recuperation output correction being ascertained as a manipulated variable, the control being based on a rule deviation resulting from a predefined maximum admissible exhaust gas temperature, which corresponds to a temperature limitation for components of the exhaust gas system of the internal combustion engine, and an actual exhaust gas temperature.

6. The method as recited in claim 1, wherein the recuperation mode of the supercharging device is engaged when a larger quantity of the exhaust gas enthalpy is available than is necessary for compression in a compressor of the supercharging device.

7. A device for operating an internal combustion engine including an exhaust gas-driven supercharging device having an electric support drive, the device configured to:
   provide an operating point specification that indicates an operating point of the internal combustion engine;
   ascertain a maximum admissible recuperation output in a recuperation mode of the electric support drive as a function of the operating point specification; and
   limit a recuperation output to the maximum admissible recuperation output in the recuperation mode.

8. A non-transitory machine-readable memory medium on which is stored a computer program for operating an internal combustion engine including an exhaust gas-driven supercharging device having an electric support drive, the computer program, when executed by a processing unit, causing the processing unit to perform the following steps:
   providing an operating point specification that indicates an operating point of the internal combustion engine;
   ascertaining a maximum admissible recuperation output in a recuperation mode of the electric support drive as a function of the operating point specification; and
   limiting a recuperation output to the maximum admissible recuperation output in the recuperation mode.

* * * * *